US008024078B2

(12) United States Patent
Coulmeau et al.

(10) Patent No.: US 8,024,078 B2
(45) Date of Patent: Sep. 20, 2011

(54) SYSTEM FOR AIDING THE TAXIING OF AN AIRCRAFT

(75) Inventors: François Coulmeau, Seilh (FR); Bernard Dubourg, Le Haillan (FR); Xavier Louis, Goyrans (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 724 days.

(21) Appl. No.: 12/106,546

(22) Filed: Apr. 21, 2008

(65) Prior Publication Data

US 2009/0018713 A1 Jan. 15, 2009

(30) Foreign Application Priority Data

Apr. 25, 2007 (FR) ..................................... 07 02991

(51) Int. Cl.
*G01C 23/00* (2006.01)

(52) U.S. Cl. .................. 701/3; 701/14; 701/15; 701/16; 701/208; 701/211; 244/75.1

(58) Field of Classification Search .................. 701/3–5, 701/7, 14–16, 208, 211; 244/3.1, 75 R, 158.1, 244/75, 158.11

See application file for complete search history.

(56) References Cited

U.S. PATENT DOCUMENTS

| | | | | |
|---|---|---|---|---|
| 6,282,417 | B1 * | 8/2001 | Ward | 455/431 |
| 2007/0031007 | A1 | 2/2007 | Bitar | |
| 2007/0053609 | A1 | 3/2007 | Bitar et al. | |
| 2007/0078591 | A1 | 4/2007 | Meunier et al. | |
| 2007/0078592 | A1 | 4/2007 | Meunier et al. | |
| 2007/0088492 | A1 | 4/2007 | Bitar et al. | |
| 2007/0129855 | A1 | 6/2007 | Coulmeau | |
| 2007/0150117 | A1 | 6/2007 | Bitar et al. | |
| 2007/0150121 | A1 | 6/2007 | Bitar et al. | |
| 2007/0168111 | A1 | 7/2007 | Dubourg | |
| 2007/0174005 | A1 | 7/2007 | Bitar et al. | |
| 2007/0179703 | A1 | 8/2007 | Soussiel et al. | |
| 2007/0187554 | A1 | 8/2007 | Bitar et al. | |
| 2007/0215745 | A1 | 9/2007 | Fleury et al. | |

(Continued)

FOREIGN PATENT DOCUMENTS

DE 41 40 406 6/1993

(Continued)

OTHER PUBLICATIONS

U.S. Appl. No. 11/575,969, filed Mar. 24, 2007, Bitar et al.

(Continued)

*Primary Examiner* — Gertrude Arthur Jeanglaud
(74) *Attorney, Agent, or Firm* — Lowe Hauptman Ham & Berner, LLP

(57) ABSTRACT

A system on an aircraft used during taxiing or air/ground and ground/air transitions. The system groups together a set of devices for mapping the airport zone presenting the crew with a set of elements catalogued in a database and/or updated as a function of information received dynamically. The system group has control or monitoring of compliance with regulations and other mobile craft, consolidating the airport topological information, the ground control instructions and the applicable operational rules. The system groups have routing, that is preparation of the taxiing phase during an arrival or preparation for takeoff, by depicting the interactions with the ground control for receiving the taxiing instructions, and from the aircraft to the ground control to inform the same of the aircraft capabilities. The system groups have guidance in the form of instructions presented to the crew, and of automatic speed management capabilities, for managing emergency situations.

20 Claims, 1 Drawing Sheet

U.S. PATENT DOCUMENTS

| | | | |
|---|---|---|---|
| 2007/0219678 | A1 | 9/2007 | Coulmeau |
| 2007/0219679 | A1 | 9/2007 | Coulmeau |
| 2007/0219705 | A1 | 9/2007 | Bitar et al. |
| 2007/0222666 | A1 | 9/2007 | Coulmeau |
| 2007/0250223 | A1 | 10/2007 | Francois et al. |
| 2007/0276553 | A1 | 11/2007 | Bitar et al. |
| 2007/0285283 | A1 | 12/2007 | Bitar et al. |
| 2008/0004801 | A1 | 1/2008 | Bitar et al. |
| 2008/0039984 | A1 | 2/2008 | Bitar et al. |
| 2008/0046171 | A1 | 2/2008 | Bitar et al. |
| 2008/0065312 | A1 | 3/2008 | Coulmeau et al. |
| 2008/0065352 | A1 | 3/2008 | Coulmeau |

FOREIGN PATENT DOCUMENTS

| | | |
|---|---|---|
| FR | 2 891 645 | 4/2007 |
| FR | 2 891 646 | 4/2007 |

OTHER PUBLICATIONS

U.S. Appl. No. 11/912,243, filed Oct. 22, 2007, Fabre et al.
U.S. Appl. No. 11/995,099, filed Jan. 8, 2008, Dubourg et al.
U.S. Appl. No. 12/066,499, filed Mar. 12, 2008, Sacle et al.
U.S. Appl. No. 11/683,989, filed Mar. 8, 2008, Lorido et al.
U.S. Appl. No. 11/856,019, filed Sep. 15, 2007, Coulmeau et al.
U.S. Appl. No. 11/870,338, filed Oct. 10, 2007, Deker et al.
U.S. Appl. No. 11/923,283, filed Oct. 24, 2007, Deker et al.
U.S. Appl. No. 11/934,751, filed Nov. 3, 2007, Sacle et al.
U.S. Appl. No. 11/942,240, filed Nov. 19, 2007, Deker et al.
U.S. Appl. No. 11/951,797, filed Dec. 5, 2007, Coulmeau et al.
U.S. Appl. No. 11/955,254, filed Dec. 12, 2007, Coulmeau et al.
U.S. Appl. No. 11/957,202, filed Dec. 14, 2007, Coulmeau.
U.S. Appl. No. 11/957,239, filed Dec. 14, 2007, Coulmeau et al.
U.S. Appl. No. 11/963,753, filed Dec. 21, 2007, Biter et al.
U.S. Appl. No. 11/963,724, filed Dec. 21, 2007, Coulmeau et al.
U.S. Appl. No. 12/016,979, filed Jan. 18, 2008, Marty et al.
U.S. Appl. No. 12/030,392, filed Feb. 13, 2008, Sallier et al.
U.S. Appl. No. 12/041,731, filed Mar. 4, 2008, Sacle et al.
U.S. Appl. No. 12/047,885, filed Mar. 13, 2008, Fleury et al.
U.S. Appl. No. 12/047,633, filed Mar. 13, 2008, Fontaine et al.

* cited by examiner

SYSTEM FOR AIDING THE TAXIING OF AN AIRCRAFT

RELATED APPLICATIONS

The present application is based on, and claims priority from, French Application Number 07 02991, filed Apr. 25, 2007, the disclosure of which is hereby incorporated by reference herein in its entirety.

FIELD OF THE INVENTION

The field of the invention is that of aiding the taxiing of an aircraft on an airport, ensured by airport procedures aboard the aircraft, where taxiing includes the air/ground and ground/air transitions.

BACKGROUND OF THE INVENTION

Currently, within the framework of the airport phases, the division of onboard/ground control responsibilities, the operational procedures, the traffic density and the significant number of parties on the airport platform do not allow an aircraft to avail itself of equipment having the capability of synthesizing all the information in order to move in an optimal manner.

One solution consists in using the existing systems installed aboard the aircraft such as the flight management system or FMS the acronym standing for the expression Flight Management System, the integrated monitoring system or ISS the acronym standing for the expression Integrated Surveillance System and to enhance them with taxiing assistance functions.

A flight management system comprises in a conventional manner one or more microprocessors linked to a work memory, a program memory, a data storage memory and to an input-output interface, these programs being aimed at ensuring various functions. But the functions accessible via an FMS are insufficient to achieve the objectives of the function:

Location offered by an FMS system is of the order of 100 m while the ground part requires means for positioning of the order of 10 m for the display functions, of the order of 1 m for the alert and guidance assistance functions and less than 1 m for the automatic guidance functions.

Construction of the "taxiing plan" is highly prescribed by the ground control authority or "ATC" the acronym standing for the expression Air Traffic Control and is often incremental and partial as a function of the various control zones distributed over the airport. For example, on large-scale international airports, such as Paris Charles De Gaulle, one controller is in charge of the runway zone, a second the taxiways and a third the passenger boarding zones. The course is then dictated to the pilot as he advances. He stops at the limits of each control zone and cannot cover the whole of the movement, from the runway to the boarding gate (or the reverse journey). In fact, the tools and processes available in an FMS are not appropriate since they are designed to describe the whole of a flight, from takeoff to landing so as to perform all the calculations necessary for the consumption predictions and for the guidance instructions. Additionally, the descriptions of the ground procedures are not standardized, unlike the in-flight procedures which are available onboard from the FMSs through a database arising from data published by the State control bodies.

The aircraft performance database PERF is not suited to the taxiing model.

The lateral trajectory calculation module takes account of the performance of the aircraft while the ground taxiing must take account of the topology of the airport.

The objective of the predictions is to construct a vertical profile that is optimized on the lateral trajectory. On the ground, only the horizontal speed can be adjusted.

The objective of the ground guidance is to present the instructions to be applied manually (except the emergency instructions).

Likewise, the functions accessible via the ISS are insufficient to achieve the objectives of the function:

the ground monitoring is not taken into account, the consolidation is not processed between the traffic and terrain situations, the anticipation functions are based on trajectories computed using the data of the FMS in 3D or 3D+time.

Additionally, certain airport mapping systems, such as those present in EFBs the acronym standing for Electronic Flight Bag (which are applications used by pilots on portable computers to prepare their flights and which do not form part of the onboard avionics) or specific products such as the OANS make it possible:

to display the map of the airport showing the position of the aircraft and its situation with respect to the topology of the airport and to the surrounding structures, to obtain information on "airport items" by way of the user interface, to obtain annotations, advice (e.g. "Approaching Runway").

But these functions ensure only limited monitoring, because they rely exclusively on databases describing the geometry of the airport, whose updating frequency is related only to the alterations in the infrastructures and not to the rules of use dictated (and modified periodically) by the local control authorities; in particular, they are insufficient notably to:

display a map presenting the most variable airport information, such as for example the directions prohibited as a function of the landing direction chosen by the control as a function of the force and direction of the local wind, process this same dynamic information to assist the crew in viewing or selecting the course elements prescribed by the ground control, ensure a routing function offering the crew automation of the actions making it possible to chain together the designated course elements and to calculate various relevant parameters, such as an estimate of the fuel consumed for example or indications of directions to the diverse branch-offs encountered and present the course computed as a supplement to the mapping of the infrastructures.

Finally, the role of certain functions, such as the "RAAS" the acronym standing for the expression Runway Awareness and Advisory System from Honeywell, available through the EGPWS product, is to warn the crew during the approach to a runway. They are based on the runway information alone, independently of the possible connections with the taxiways or of their real activity. Moreover, segregation of the equipment used during the taxiing phases prevents these messages from being correlated with course information computed through a routing means or a richer database availing itself of all the information on the airport surface.

SUMMARY OF THE INVENTION

The aim of the invention is make it possible to ensure effective taxiing aid by integrating all the devices and methods that may turn out to be useful within a single architecture allowing relevant sharing of the information computed by each of the parts to the others.

More precisely the subject of the invention is an integrated system carried onboard the aircraft used during taxiing or air/ground and ground/air transitions whose final objective is assistance to the crew in collaboration with the ground control authority.

This system receives the movement authorizations and instructions from the control, so as to reach the successive points of the aircraft's course over the airport.

In return, the system integrates a capability for predicting the aircraft's movement capabilities based on the performance database and returns a description to ground control of the envisaged 'dates' of passing the various control points. Control can then reclose the optimization loop by centralizing the information of all the aircraft in operation in the zone and by utilizing it to optimize the flow over the airport surface and limit the aircraft movement and holding times, engine running.

The system groups together a set of devices making it possible to aid the crew in managing the taxiing or transition phase so as to ensure the consistency of the whole, to enable the correct decision to be taken rapidly in conformity with the safety requirements, the decision element remaining based on viewing through the window.

The proposed system breaks away from those of the prior art in that it proposes an integrated system including all the services, which is a required condition making it possible to guarantee the consistency of the information presented to the crew.

More precisely the subject of the invention is an onboard system for aiding the airport taxiing of an aircraft linked to a user interface, the user being the crew, this interface comprising a display device, and an inputting element, a device for ground-onboard communication with the ground control, able to deliver instructions, geo-location means, and equipped with a location device linked to the geo-location means, with a database management system, with a mapping device linked to the location device, to the database management system and to the user interface, with a control device linked to the location device and to the database management system and to a central computer of alarms and which comprises a module of systematic alerts.

It is mainly characterized in that the database management system comprises a "CABD" database of airport maps which comprises a data connectedness chaining, an "AUTH" database which comprises possible movement and course preferences granted by the ground control, taxiing rules and airport procedures evolving over time, and in that the mapping device comprises an "Airport map" module for 2-dimensional graphical representation of the data arising from the database management system, which comprises means for filtering the said data with a view to their graphical representation.

Preferably the mapping device comprises a "3D Airport" module for graphical representation in 3 dimensions or in a compliant view, of the airport data and/or an "Airport traffic" module for graphical representation of traffic data, these data arising from the database management system.

Advantageously, the database management system furthermore comprises a "CIE" database of preferences of the aircraft's airline company and/or a "DYN" database of dynamic information evolving over time, and/or a "NOTAM/PIB" database including NOTAMs and pre-flight information bulletins received by the ground-onboard communication device and the mapping device comprises a "NOTAM Map" module for cartographic representation of the said data, when they relate to temporary restrictions of use of certain parts of the airport infrastructures.

According to a characteristic of the invention, the control device is furthermore linked to the user interface and comprises an "Active monitoring" module for representation and active monitoring linked to an anti-collision alert system, and/or a "Mobile craft monitoring" module for representing and monitoring mobile craft, linked to a traffic computer.

The control device preferably comprises an "Operational alerts and supervision" module able to emit operational violation alert messages and to model trajectories of the aircraft and/or mobile craft in proximity to the aircraft in conjunction with the taxiing procedures and/or instructions and linked to the ground-onboard communication system. It possibly comprises a "resolution" module linked to the "Active monitoring" module and/or "Mobile craft monitoring" module and able to modify the trajectory of the aircraft as a function of alerts.

The system advantageously comprises a routing device linked to an FMS, to the location device, to the database management system, to the ground-onboard communication device, to the user interface, and this routing device comprises an "Entry" module for inputting information by the crew and/or for receiving information arising from the database management system and/or the ground-onboard communication device.

According to a characteristic of the invention, the routing device comprises a "Plan" module for managing one or more taxiing plans established on the basis of the database management system and/or the "Entry" module and/or comprises a "Path" module for establishing a course of the aircraft in the airport, linked to the "Plan" module and "Operational alerts and supervision" module and/or a "Sequencing" module for sequencing the taxiing plan of the aircraft.

The system preferably comprises a guidance device linked to the location device, to the database management system, to the user interface, to a braking system and to a steering system and this guidance device comprises a "Guidance information" module for computing directional tags and/or a "Tracking" module able to correct the trajectory of the aircraft, linked to the "Guidance information" module and to the "Sequencing" module and linked to the "tracking" module and/or a "Slaving" module able to control the ground speed and/or the braking of the aircraft, linked to the "tracking" module and/or a "recovery" module able to apply instructions for automatic slaving of the position and/or speed of the aircraft, linked to the "Resolution" module.

The subject of the invention is also a method for aiding the airport taxiing of an aircraft, characterized in that it comprises the following steps ensured aboard the aircraft:

cartographic displaying of the airport zone as a function of dynamically received information, monitoring of the airport zone as a function of predefined rules and of information on the surrounding traffic.

According to a characteristic of the invention, the cartographic display step comprises a sub-step of filtering the information received.

According to another characteristic of the invention, the monitoring step comprises the following sub-steps:

receiving audible and/or visual alerts relating to the infrastructure of the airport zone and to the surrounding traffic, evaluating the situation of the aircraft as a function of these alerts comprising a modelling of the trajectories of the aircraft and of the mobile craft of the surrounding traffic, modifying the aircraft speed instructions.

It furthermore preferably comprises the step of preparing the taxiing phase ensured aboard the aircraft.

According to a characteristic of the invention, this step of preparing the taxiing phase comprises the following sub-steps:

inputting or receiving information, managing at least one taxiing plan, converting the taxiing plan into a continuous path, sequencing the taxiing plan.

Advantageously, it furthermore comprises the following step ensured aboard the aircraft, of guiding the aircraft as a function of instructions received from a ground control authority and of the capabilities of the aircraft.

According to a characteristic of the invention, the guidance step comprises the following sub-steps of:

correcting the trajectory and/or the speed and/or the motorization of the aircraft, slaving the speed of the aircraft.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

A system for aiding taxiing according to the invention will be described by referring to FIG. 1.

DETAILED DESCRIPTION OF THE DRAWINGS

Figure 1:
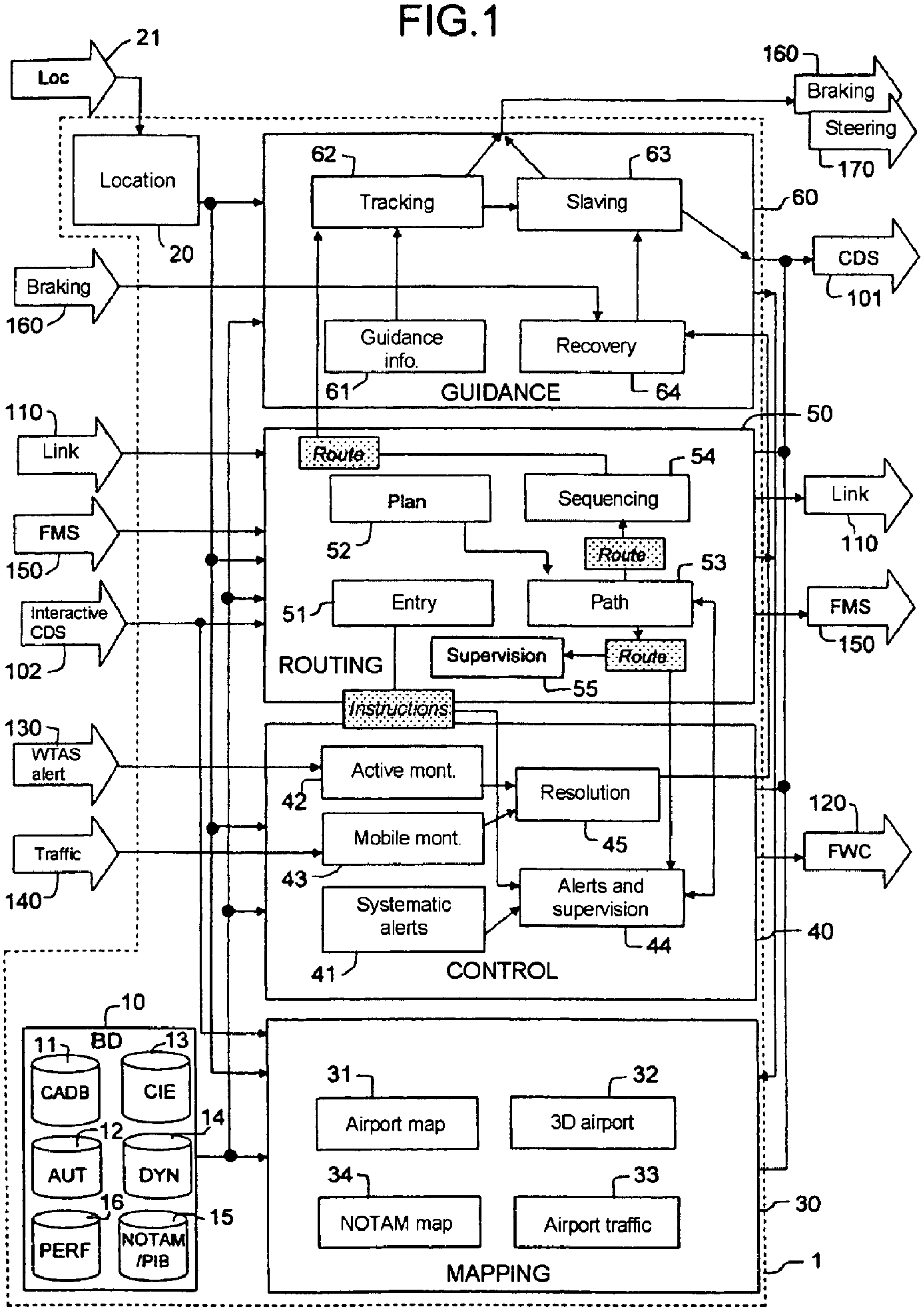

The system 1 for aiding taxiing according to the invention groups together a set of devices making it possible to aid the crew in managing the taxiing or transition phase so as to ensure the consistency of the information provided to the crew, and to offer a capability to enable the correct decision to be taken rapidly in compliance with the safety requirements, the decision element remaining based on viewing through the cockpit.

This set of devices is made up of devices for:

Mapping 30 the airport zone presenting the crew with the set of useful elements catalogued in a database and/or updated as a function of the active NOTAMs, NOTAM being the acronym standing for the expression NOtice To AirMen and pre-flight bulletins or PIBs the acronym standing for the expression Pre-Flight Bulletin received dynamically by the data link during flight preparation.

Control 40 or monitoring of the compliance with the regulations and the other mobile craft in proximity or on the airport surface, consolidating the topological information of the airport, the instructions of the ground control and the operational rules applicable.

Routing 50, that is to say preparation of the taxiing phase during an arrival or preparation of a takeoff, by depicting the interactions with the ground control for receiving the taxiing instructions, but also from the aircraft to the ground control to inform same of the real capabilities of the aircraft as a function of a modelling of its performance.

Guidance 60 in the form of instructions presented to the crew, but also of optional automatic speed and braking management capabilities for the purposes of optimizing the fuel oil consumptions, for managing emergency situations detected by the monitoring device 40 but requiring immediate action no longer permitting a delay in human reaction and action.

These devices are respectively linked at input to a location device 20 able to ensure a location function compatible with the monitoring and guidance requirements, notably in terms of location precision, typically of the order of 1 m. Specifically, location of simple GPS type, of a precision of about 10 m does not make it possible to guarantee the positioning of the aircraft on the correct element of the airport. Improvement of position measurement relies on:

sensors 21 (GALILEO, WAAS, EGNOS), “WAAS” the acronym standing for the expression Wide Area Augmentation System being a wide-zone improvement system, as opposed to local systems based on differential measurements with respect to a known point, “EGNOS” the acronym standing for the expression European Geostationary Navigation Overlay System being the European version of WAAS;

measurement algorithms taking into account conditions suited to ground navigation (elimination of low-orbit satellites, etc), measurements by wing radar setting, by EVS-based image analysis the acronym standing for the expression Enhanced Vision System.

These devices are respectively linked to a user interface which comprises an input interface 102 or “Interactive CDS” such as a mouse, and an output interface 101, typically a cockpit display system or CDS the acronym standing for the expression Cockpit Display System.

The system according to the invention comprises a database management system 10 which mainly comprises 4 databases relating to airport information:

The “CADB” base 11 describes the mapping of the airport such as standardized in the ARINC-816 document. It contains in particular the location of all the visual elements and their attachment to a physical entity of the airport through a container, such as a taxiway or a runway for example. The set of containers and elements included in the database are described in ARINC-816. Beyond the simple grouping of the data in containers, the proposed base advantageously ensures the connectedness chaining of the elements in the form of an N-ary tree, describing for each of the elements of the airport the set of elements of the airport that are immediately reachable from the element considered.

The “DYN” database 14 describes the state of various dynamic elements of the airport zone which can evolve over time. This base is updated independently of the CADB base and with different periodicities, possibly through the ground-onboard bilateral link (or ATC Datalink) for updating the NOTAMs. It is designed to contain:

pilot or crew annotations intended to be shared with other devices such as the routing or control devices, pilot or crew annotations relating to the restrictions in movement over the set of structures of the airport (one-way stretches, size/weight limitations, repair works, etc.), automatic updates by ground-onboard link of the local and/or temporary databases relating to the traffic areas for departure and the arrival terminals.

The "AUTH" procedures base 12 contains the taxiing rules defining the correspondence between the mapping of the airport and the procedures associated with the control points, but also the routes favoured by each airport (chaining of the several procedures) and the final approaches used on the airports, including the PD/PE/PF type sections of the ARINC-424 navigation base. The "AUTH" base describes the set of airport zone applicable procedures which can evolve over time, independently of the geometry of the airport. This base is therefore updated independently of the CADB base and with different periodicities, possibly through the ground-onboard link for updating the NOTAMs. It is designed to contain:

the restrictions in movement over the set of structures of the airport (one-way stretches depending on the runway in service, size/weight limitations, repair works, etc.)

the approach procedures used on the airport, corresponding in particular to the PD/PE/PF sections of the ARINC-424 format, the taxiing procedures defined as unit operations between control points (stopbars, boarding gates, runway, holding zones, parking bays, etc.) or precisely located reference points, the paths or course routes favoured by the airport management authorities, defined as series of taxiing procedures, by analogy with the ER (En Route) section of the publications in the ARINC-424 format which describe the flight trajectories as sequences of legs.

The "CIE" company preferences database 13 makes it possible to simplify the procedures for negotiating the course with the ATC. Specifically, the airlines are often allocated the same passenger access gates and can then expect to define in a single base for all the aeroplanes of the company, the favoured routes for getting from their gates to the various runways, in keeping with the favoured routes published by each airport. This "CIE" base describes in particular the description of the courses attaining the parking bays or gates generally allocated to the company and the courses favoured by the airport, statistics for the gate/runway movement times as a function of the airport, the period of the year and the meteorological conditions, all the information judged useful for the crews in managing taxiing or for preparing flights (telephone numbers, location of the structures for receiving the crews).

The database management system furthermore comprises a "PERF" database 16 specific to the aircraft which contains models of:

fuel oil consumption allowing reliable estimation of the total mass or "gross weight" and rules for optimizing the variations in the thrust in order to adapt the speed and control it, passenger comfort laws determining the accelerations, notably longitudinal, making it possible, with a view to automated ground guidance, to ensure the control of the speed in compliance with passenger comfort rules, braking laws making it possible to guarantee compliance with the limits in emergency or heavy braking situations (RTO).

The database management system 10 also comprises the "NOTAM/PIB" database 15 which contains the data updated by the ground-onboard link during the flight preparation phase, including the NOTAMs (NOtice To AirMen) and the Pre-flight Information Bulletins. This base is shared between the control 40 and mapping 30 devices for monitoring and display.

This database management system 10 is linked to the mapping 30, control 40, routing 50 and guidance 60 devices.

The mapping device 30 encompasses the means allowing the crew to avail themselves of the situation of the aircraft with respect to its environment and possibly to avail themselves of the authorizations and restrictions prescribed by the ground control authority. This involves for example prohibited zones and/or instructions ("clearance") granted by the control authority on the crossing of elements of stopbar type or by the instrument landing system ILS because of the inactivity of certain runways for example.

This mapping device 30 is linked at input to the CADB, DYN, NOTAM/PIB and AUTH databases, the second possibly being updated by the ground-onboard link and at output to the CDS. It encompasses the following modules.

The "Airport map" module 31 or "AIRPORT MAP" module which is linked to the CADB and DYN databases, is in charge of describing the situation of the aircraft and its environment and includes:

a cartographic representation of the airport according to the options of representation defined by the pilot and of the state of various elements of the airport, arising from the DYN database 14, an improvement in filtering the textual information of the objects of the database (or "decluttering of labels") so as not to overload the graphics.

The "Airport traffic" module 33 or "AIRPORT TRAFFIC" module is in charge of describing the situation of the aircraft and its environment, including:

the graphical representation of the traffic of the airport in proximity to the aircraft, improvement in the filtering of the textual information of the objects of the database.

The "3D Airport" module 32 or "AIRPORT 3D" module which is linked to the CADB database, is in charge of the graphical representation in 3D (three-dimensional) or in a compliant view, of the airport zone including:

the infrastructures with preferably a precision of less than or equal to 1 m, the information on direction tags or the runways or taxiways available, the course computed by the routing device, the possible corrections to be made so as to remain on the course computed by the guidance device, the instructions (stopbars, runways closed, etc.).

It is recalled that a compliant view is for example obtained through a "HUD" the acronym standing for the expression Head-Up Display, which ensures viewing of information in the visual field of the pilot through the windscreen.

The "NOTAM MAP Map" module 34 or "NOTAM MAP" module is in charge of describing the situation of the aircraft and its environment, including the cartographic representation of the PIBs and NOTAMs received by the ground-onboard link during the flight preparation phase.

The control device 40 encompasses the means allowing the crew to:

receive the audible and/or visual alerts in the event of abnormal movement and/or abnormal approaching of other elements of the environment of the aircraft or of a manifest violation of an operational rule, be offered the instructions making it possible to solve the potentially dangerous situation notably by the representation of the aircraft and mobile craft deploying in proximity to the aircraft, by applying representation rules making it possible to preserve only those which are actually useful to the perception of the situation, of the state of the topological elements of the airport surface received through the databases AUTH or CIE or NOTAM/PIB, such as the runways or taxiways that are closed for example.

This control device 40 is linked at input to the location device 20 and to the database management system 10 and to the input user interface 102 and at output to the "CDS" 101, to a central computer of alarms 120 or "FWC" the acronym standing for the expression Flight Warning Computer.

The input and output data of this control device 40 are summarized in this table:

| Input data | Data produced |
|---|---|
| Representation mode chosen by the pilot<br>Position of the aircraft<br>Position of the surrounding aircraft<br>State of the elements of the airport through the bases AUTH or CIE and NOTAM<br>Databases CADB; AUTH; CIE; NOTAM | Cartographic representation of the airport including the restrictions and state of the elements<br>Representation of the relevant aircraft |

The control device encompasses the following modules:

The "Systematic alerts" module 41 or "RAW ADVISORY" module is in charge of evaluating the situation to determine whether it may evolve towards a situation that is dangerous for the crew and the aircraft. The situations evaluated are termed "raw" since they are not correlated with the instructions received from the control nor inter-compared. They are then generally systematic, such as the verbal message "Approaching Runway" proposed independently of the fact that the control has or has not authorized the aircraft to approach the runway. The elements monitored are the infrastructures and the surrounding mobile elements so as to detect:

the use of "infrastructure" elements that are not compatible with the size or the weight of the aircraft, the deviation from the centre of the elements to be followed (taxiways, runways, park-line, etc.), the use of a control zone normally subject to authorization from control, such as runways, holding zones, stopbars, markings of the ILS zones, etc.

The control device is possibly linked to external systems able to evaluate the conditions by themselves and to transmit their results.

The same applies in respect of the traffic information: the proposed device authorizes external systems (a TCAS or a "Traffic Computer" based on ADS-B/TIS-B, for example) to broadcast information relating to the aeroplanes in proximity and/or their orientations, judged dangerous. Otherwise, the computation of the situation is carried out autonomously.

The input and output data of the "Raw Advisory" module is summarized in this table:

| Input data | Data produced |
|---|---|
| "Infrastructure"<br>Position of the aircraft<br>Databases CADB | List of "infrastructures" being breached |
| "Control zone"<br>Position of the aircraft<br>Databases CADB<br>[OPTION] External evaluations of the proximity | List of the "control zones" being breached |
| "Mobile craft"<br>Position of the aircraft<br>Position of the surrounding aircraft<br>[OPTION] External proximity measurement of the aircraft | List of the "mobile craft" situations that may evolve dangerously |

The "Mobile craft monitoring" module 43 or "MOBILE SURVEILLANCE" module is in charge of presenting and monitoring the mobile craft deploying in proximity to the aircraft. It is linked with the traffic computer 140 and the CABD database 11 for mapping the airport and provides notably information relating to:

incursions onto the runway or the occupancy of the runway or the neighbouring landing or takeoff runways, to the traffic converging towards the taxiways, the detection of the proximity of "mobile craft", in terms of closing distance or time (aeroplanes, lorries, etc.).

The "Active monitoring" module 42 or "ACTIVE SURVEILLANCE" module is in charge of monitoring the infrastructures, active location by radar of threats and the corresponding presentation. It measures for example the separation distances between aircraft during the phases of fast or slow taxiing on the taxiways. It possibly allows active detection by radar systems aboard the aircraft of fixed or mobile obstacles. It proposes to use alerts generated by external systems so as to consolidate them in relation to the procedures in force (infrastructure or traffic), thereby allowing the device to concentrate on matching up the alerts with operational situations and the probability of infringing them.

The "Operational alerts and supervision" module 44 or "OPERATIONAL ALERT & SUPERVISION" module is in charge of evaluating the situation to determine whether it may evolve towards a violation of the operational rules. The situations evaluated are inter-correlated, with the applicable procedures and with the instructions received. Contrary to a "RAW ADVISORY" condition, an "OPERATIONAL ALERT" situation must not happen and is a serious breach of the safety rules. It proposes a device for consolidating the situation with the operational taxiing procedures which is an inescapable requirement making it possible to synthesize the relevant item of information and to dispatch it to the pilot and to reduce nuisance alerts in extremely dense operational conditions.

It proposes a device for comparing the past and predicted trajectory of the other aircraft with the approach procedures in force on the airport (ground or air) so as to help to resolve the ambiguities in the procedures applied by the other aircraft in the approach.

The main functions to be rendered are:

The modelling of the trajectory of the monitored aircraft, one of the innovative aspects of which consists in modelling the past trajectory of the aircraft and the future intention of the aircraft, according to three refinement levels: series of points, series of segments, flight plan.

The evaluation of the potential conflict zones between the aircraft and the mobile craft in proximity. Calculation of these zones relies on the "No-Go-Zones" calculation principles used by the control systems of the ATC.

The matching of the short-term trajectory of the aircraft with the topology of the airport and the applicable procedures.

The matching of the short-term trajectory with the authorizations received from the control.

The verification of the compatibility of the designated route with the type of aircraft, to anticipate for example the detection of the use of incompatible taxiways and to avoid alerting the crew only when the aircraft is already in proximity or indeed on top.

For example, the "approaching runway" condition which is today systematic on the approach to the runway must become an operational instruction violation message of the "runway incursion" type if:

1) The aircraft is on a taxiway element leading to the runway and,

2) The aircraft is currently crossing an element requiring an instruction (stopbar, ILS zones, etc.) and, 3) The aircraft has not received the instruction to cross the element or it has received the order to stop.

If moreover another aircraft is on the approach on this same runway, the conflict is two-fold and the aircraft in flight will have to trigger an alert of "runway occupancy" type if:

1) The aircraft in flight is on a final approach and,

2) The aircraft is on the point of putting down (in a timescale of a few tens of seconds) and, 3) The aircraft identifies the aircraft on the ground on (or about to enter) the runway for which it has been authorized.

The input and output data of the "Operational alert and supervision" module 44 are summarized in this table:

| Input data | Data produced |
|---|---|
| Position of the aircraft<br>CADB and AUTH Databases<br>Authorizations of the control<br>Evaluation of the "raw advisory" situations<br>Position of the surrounding aircraft<br>[OPTION] Intention of the surrounding aircraft and mobile craft | Operational violation alert messages<br>Modelling of the past and future trajectories of the surrounding aircraft and mobile craft<br>Computation of the no-go-zones with the surrounding mobile craft |

The "Resolution" module 45 is in charge of computing the necessary modification of the behaviour of the aircraft so as to exit a detected alert situation such as a situation making it necessary to react in extremely short timescales (compared with the human reaction/action time) to avoid serious situations.

It calculates the speed conflict resolution conditions making it possible to aid the pilot in the metering of his braking or indeed to automate it. This module is not responsible for slaving, but solely for computing the instructions along two lines:

speed resolution to maintain a minimum separation between aircraft on the runways, speed resolution to assist the braking of the aircraft (or possibly acceleration) notably in the event of conflict with another aircraft or in the event of instruction violation.

The routing device 50 encompasses the modules allowing the crew to prepare its taxiing phase and to track the progress thereof. This routing device is linked at input to the location device 20, to the database management system 10, to the ground-onboard link 110, to the FMS 150 and to the input user interface 102 and at output to the "3D Airport" module 32 of the mapping device, to the display system in the cockpit 101, to the ground-onboard link 110, to the FMS 150.

This device relies on the following modules:

The "Entry" module 51 or "ENTRY" module is in charge of inputting or receiving information, notably a subset of routes of the airport arising from the AUTH or CIE databases, instructions, desired speed routes arising from these databases and/or transmitted by the ground-onboard data link. It makes it possible to receive the taxiing instructions from control through the ground-onboard link and to construct the sequence of operations requested by control. As an option, it is possible to propose to be able to modify or input the taxiing plan manually through an interface of "FMD" type the acronym standing for the expression Flight Management Display, on the basis of the VHF communication established with the control for non-equipped airports or during the period of deployment of the ground means. For example, this inputting could rely on a ground procedures base arising from the "AUTH" and "CIE" bases.

The "PLAN" module 52 is in charge of managing one or more taxiing plans, negotiated between the aeroplane and the control authority during the flight preparation phase. For example, control may wish to propose an alternative procedure in the case where the traffic flow does not proceed as had been envisaged at the time of negotiation.

Moreover it proposes capabilities for verifying and/or semi-automatically inputting the taxiing plans which make it possible to ensure that the sequence of commands received from the ATC via the data link or input by the pilot on the basis of the instructions received by VHF are consistent.

Finally, it allows a revision of the existing taxiing plan or plans through the ATC messages, by analogy with the capabilities for revising the FMS through messaging of CPDLC type.

Additionally, this module is major for ensuring the air/ground continuity of the landing phases, because it is the element making it possible to describe the first elements of the taxiing phase consistently with the end of the flight phase. By way of example today, a flight plan terminates with the approach, strung together with the go-around procedure if necessary and it is possible to share the procedure used for the approach between the FMS—in charge of the air part—and the assistant to the taxiing phases, through the AUTH base for example. Then, on activation of landing by the pilot (braking, airbrake, etc.), the ground mode is instigated so as to get to work as soon as the aeroplane can no longer make a go-around and thus activate a runway evacuation assistance function based on the runway used and on the knowledge of the utilizable outputs.

The input and output data of the "plan" module 52 are summarized in this table:

| Input data | Data produced |
|---|---|
| CADB and AUTH and CIE Databases<br>Messaging of control for scheduling taxiing<br>Manual modifications by the crew or semi-automated modifications of the taxiing plans | The taxiing plans input. As a minimum, the envisaged plan and an alternative plan, both described in the form of a sequence of ground procedures. |

Once the plan has been established, the "Path" module 53 or "PATH" module is in charge of converting the sequence of commands of control into the establishment of the continuous course that will have to be carried out by the aircraft on the airport surface. This module is possibly in charge of a finer or coarser estimate of the time and of the speed profile of the aircraft taking account of the calculated path, the fuel consumption, the restrictions or instructions allocated by control and the required spacing margins. This module makes it possible to refine the estimation of the takeoff time, relying for example on statistical approaches, as presented in the study of the air traffic management system in Europe or "Sesar" the acronym standing for the expression Single European Sky Air traffic management and Research, for which "average" durations of course have been measured on a few airports, as a function of meteorological conditions, season and traffic density. This course prediction is transmitted:

to the monitoring modules 42 and 43 to identify a priori incompatibilities of the proposed course with the structure of the airport and the active NOTAMS, to the display device 101 to present the envisaged course and the sections which have been authorized by control, possibly to the ground to allow a device for optimizing the global traffic to integrate the course calculated by each aircraft and to prescribe to them, in return, constraints on the times of passing the control points.

The input and output data of the "path" module 53 are summarized in this table:

| Input data | Data produced |
|---|---|
| The CADB, AUTH and CIE databases<br>The flight plan to be calculated<br>The data of the performance model | The description of the lateral trajectory,<br>continued,<br>in accordance with the topology of the airport,<br>armed with the estimates of the times of passing the various landmark points |

The "Sequencing" module 54 or "SEQUENCING" module proposes a sequencing of the taxiing plan as a function of the 2D position+time so as to track the course on the taxiing plan, present the current position to the crew and inform control of the level of advance of the procedure.

According to the possible architecture schemes, this module is associated with the navigation part of the FMS 150. The role of this module is to:

determine the positioning of the aircraft on the geometric elements describing the envisaged path (2D+time) and the speed, track the progress of the course and order the following segments, measure the positioning deviations with respect to the envisaged segments, broadcast the information regarding aircraft positioning on the course.

The input and output data of the "sequencing" module 54 are summarized in this table:

| Input data | Data produced |
|---|---|
| The 2D + Time trajectory<br>The position of the aircraft | The active trajectory segment<br>The following segment<br>The angular deviation between the aircraft and the segment<br>The distance deviation between the aircraft and the segment<br>The time deviation between the position of the aircraft and the position envisaged at this date |

The "SUPERVISION" module 55 is in charge of measuring the movement of the aircraft mobile on the surface of the airport along a route assigned by the "Path" module 53 so as to evaluate the movement time to go from the gate to the runway and provide an estimate of the movement time required, which will serve to estimate the takeoff time from the moment of push-back. This function is an automation of what pilots do today by supervising their "CDTI" the acronym standing for the expression Cockpit Display Traffic Interface, to evaluate their taxiing time as a function of the number of aeroplanes present on the taxiways and holding at the runway threshold.

The input and output data of this module are summarized in this table:

| Input data | Data produced |
|---|---|
| Position of the aircraft<br>CABD and AUTH Databases<br>Modelling of the past and future trajectories of the surrounding aircraft and mobile craft<br>Computation of the no-go-zones with the mobile craft<br>Authorizations of control | The characterization of the trajectory as a function of the authorizations received from control<br>The necessary messages (advisories) |

The guidance device 60 which is aimed at seeing to it that the aircraft remains on the envisaged course and reaches the assigned destination, is linked at input to the location device 20, to the database management system 10 and notably to the PERF database 16, to the routing device 50, to the "sequencing" module 54 of the control device and to a braking system 160 and at output to the "3D Airport" module 32 of the mapping device, to the display system of the cockpit 101, to the braking system 160 and to a steering system 170. This guidance device is linked to a computer in charge of evaluating the orientation instructions presented to the crew or transmitted to autonomous computers.

This guidance device relies on the following modules:

The "Guidance information" module 61 or "GUIDANCE CUES" module is in charge of computing directional tags, route tracking or route junction tags relating for example to the next intersection.

The "Tracking" module 62 or "FOLLOWING" module is in charge of:

calculating the instructions for convergence to the ideal (2D+time) position, broadcasting the instructions with a view to display or slaving.

The input and output data of the "following" module 62 are summarized in this table:

| Input data | Data produced |
|---|---|
| The 2D + Time trajectory<br>The position of the aircraft<br>The active segment<br>The following segment<br>The deviations (angular, distance and time) between the aircraft and the segment envisaged at this date | The steering correction to be applied<br>The speed correction to be applied<br>The motorization correction to be applied |

The "Recovery" module 64 or "RECOVERING" module is in charge of possibly applying the instructions for automatically slaving the position and/or speed of the aircraft during emergency situations indicated notably by the "Resolution" module 45. It then replaces the "FOLLOWING" module 62 so as to ensure the trajectory and speed corrections in an emergency situation with laws that are less comfortable for the passengers. Its availability assumes, very obviously, the presence of a closed speed and position slaving system.

Likewise, this module is in charge of broadcasting to the display device and to the ground control the "RECOVERING" instructions applied. For example, in the event of braking difficulties (when raining or snowing for example), requiring the "RECOVERING" function to take over so as to ensure the end of braking before the end of the runway, then, the braking instruction is dispatched to the ground in the form of braking quality level 'fair', 'poor', 'nil' as expressed in the AIM documents of the FAA §4.3.8.

The input and output data of the "recovering" module 64 are summarized in this table:

| Input data | Data produced |
|---|---|
| The 2D + Time trajectory<br>The position of the aircraft<br>The active segment<br>The following segment<br>The resolution instructions calculated by the "RESOLUTION" function | The steering correction to be applied<br>The speed correction to be applied<br>The motorization correction to be applied |

The "Slaving" module 63 or "STEERING" module is in charge of controlling the ground speed and the braking during normal situations, with a view for example to reaching a determined speed at a specific position.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A system for aiding airport taxiing of an aircraft comprising:

an onboard system linked to:

a user interface, a user of the user interface being a crew of an aircraft, the user interface comprising a display device, and an inputting element, a device for ground-onboard communication with a ground control, and geo-location means, and the onboard system comprising:

a location device linked to the geo-location means, a database management system, a mapping device linked to the location device, to the database management system and to the user interface, and a control device linked to the location device and to the database management system and to a central computer of alarms and which comprises a module of systematic alerts, wherein the database management system comprises a first database of airport maps having a data connectedness chaining, a second database which comprises possible movement and course preferences granted by the ground control, taxiing rules and airport procedures evolving over time, and in that the mapping device comprises an Airport map module for 2-dimensional graphical representation of data arising from the database management system, which comprises filtering the said data arising with a view to the graphical representation of the data arising and in that the control device is linked to the user interface and comprises:

an Active monitoring module for representation and active monitoring linked to an anti-collision alert system, and/or a Mobile craft monitoring module for representing and monitoring mobile craft, linked to a traffic computer, and a resolution module linked to the Active monitoring module and/or Mobile craft monitoring module and able to modify a trajectory of the aircraft as a function of alerts.

2. System for aiding taxiing according to claim 1, wherein the mapping device comprises a 3D Airport module for graphical representation in 3 dimensions or in a compliant view, of the airport data and/or an Airport traffic module for graphical representation of traffic data, these data arising from the database management system.

3. System for aiding taxiing according to claim 1, wherein the database management system furthermore comprises third database of preferences of the aircraft's airline company.

4. System for aiding taxiing according to claim 1, wherein the database management system furthermore comprises fourth database of dynamic information evolving over time.

5. System for aiding taxiing according to claim 1, wherein the database management system furthermore comprises a fifth database including NOtice To AirMen (NOTAM) and pre-flight information bulletins received by the ground-onboard communication device and in that the mapping device comprises a NOTAM Map module for cartographic representation of the said data when they relate to temporary restrictions of uses of certain parts of the airport infrastructures.

6. System for aiding taxiing according to claim 1, wherein the control device comprises an Operational alerts and supervision module able to emit operational violation alert messages and to model trajectories of the aircraft and/or mobile craft in proximity to the aircraft in conjunction with taxiing procedures and/or instructions, and linked to the ground-onboard communication system.

7. System for aiding taxiing according to claim 1, comprising a routing device linked to a Flight Management System (FMS), to the location device, to the database management system, to the ground-onboard communication device, to the user interface, and in that this routing device comprises an Entry module for inputting information by the crew and/or for receiving information arising from the database management system and/or the ground-onboard communication device.

8. System for aiding taxiing according to claim 7, wherein the routing device comprises a Plan module for managing one or more taxiing plans established on the basis of the database management system and/or the Entry module.

9. System for aiding taxiing according to claim 8, wherein the control device comprises an Operational alerts and supervision module able to emit operational violation alert messages and to model trajectories of the aircraft and/or mobile craft in proximity to the aircraft in conjunction with the taxiing procedures and/or instructions, and linked to the ground-onboard communication system and wherein the routing device comprises a Path module for establishing a course of the aircraft in the airport, linked to the Plan module and Operational alerts and supervision module.

10. System for aiding taxiing according to claim 9, wherein the routing device comprises a Sequencing module for sequencing the taxiing plan of the aircraft.

11. System for aiding taxiing according to claim 1, comprising a guidance device linked to the location device, to the database management system, to the user interface, to a braking system and to a steering system and in that this guidance device comprises a Guidance information module for computing directional tags.

12. System for aiding taxiing according to claim 11, wherein the guidance device comprises a Tracking module able to correct the trajectory of the aircraft, linked to the Guidance information module and to a Sequencing module.

13. System for aiding taxiing according to claim 12, wherein the guidance device comprises a Slaving module able to control the ground speed and/or the braking of the aircraft, linked to the Tracking module.

14. System for aiding taxiing according to claim 11, wherein the guidance device comprises a Recovery module able to apply instructions for automatic slaving of a position and/or speed of the aircraft, linked to a Resolution module.

15. Method for aiding airport taxiing of an aircraft, comprising the following steps ensured aboard the aircraft:

cartographic displaying of an airport zone as a function of dynamically received information, monitoring of the airport zone as a function of predefined rules and of information on surrounding traffic, this step comprising the following sub-steps:

i. receiving audible and/or visual alerts relating to infrastructure of the airport zone and to the surrounding traffic, ii. evaluating a situation of the aircraft as a function of the alerts comprising a modelling of trajectories of the aircraft and mobile craft of the surrounding traffic, iii. modifying aircraft speed instructions.

16. Method according to claim 15, wherein the cartographic display step comprises a sub-step of filtering the information received.

17. Method according to claim 15, furthermore comprising the following step ensured aboard the aircraft, of preparing a taxiing phase.

18. Method according to claim 17, wherein the step of preparing the taxiing phase comprises the following sub-steps:

inputting or receiving information, managing at least one taxiing plan, converting the taxiing plan into a continuous path, sequencing the taxiing plan.

19. Method according to claim 15, furthermore comprising the following step ensured aboard the aircraft, of guiding the aircraft as a function of instructions received from a ground control authority and of capabilities of the aircraft.

20. Method according to claim 19, wherein the guidance step comprises the following sub-steps of:

correcting a trajectory and/or a speed and/or a motorization of the aircraft, slaving the speed of the aircraft.

* * * * *